US012673516B2

(12) United States Patent      (10) Patent No.:    US 12,673,516 B2

Valovick et al.            (45) Date of Patent:      Jul. 7, 2026

(54) HALF SHAFT TO BEARING HUB CONNECTION TO REDUCE DRIVELINE CLICK

(71) Applicant: GM GLOBAL TECHNOLOGY OPERATIONS LLC, Detroit, MI (US)

(72) Inventors: Brian Michael Valovick, Oxford, MI (US); Avissai Alcantara, Sterling Heights, MI (US); Kevin P. Callaghan, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 563 days.

(21) Appl. No.: 18/110,940

(22) Filed: Feb. 17, 2023

(65) Prior Publication Data

US 2024/0278597 A1     Aug. 22, 2024

(51) Int. Cl.
| | |
|---|---|
| *B60B 27/00* | (2006.01) |
| *B60B 35/12* | (2006.01) |
| *B60B 35/18* | (2006.01) |
| *B60B 35/00* | (2006.01) |

(52) U.S. Cl.
CPC .......... *B60B 27/0026* (2013.01); *B60B 35/18* (2013.01); *B60B 35/003* (2013.01); *B60B 35/128* (2013.01); *B60B 2900/133* (2013.01); *B60B 2900/5112* (2013.01)

(58) Field of Classification Search
CPC ........... B60B 27/0026; B60B 27/0036; B60B 27/0073; B60B 35/128
See application file for complete search history.

(56) References Cited

U.S. PATENT DOCUMENTS

| | | | |
|---|---|---|---|
| 5,639,099 A | 6/1997 | Booker et al. | |
| 6,135,571 A | 10/2000 | Mizukoshi et al. | |
| 6,286,909 B1 * | 9/2001 | Mizukoshi ............ | F16C 35/073 |
| | | | 301/105.1 |

(Continued)

FOREIGN PATENT DOCUMENTS

| | | |
|---|---|---|
| DE | 69913217 T2 | 11/2004 |
| JP | 2006281959 A | 10/2006 |

(Continued)

OTHER PUBLICATIONS

U.S. Appl. No. 18/517,786, Valovick et al.

(Continued)

*Primary Examiner* — Jason R Bellinger

(57)           ABSTRACT

A vehicle drive assembly including a wheel bearing hub and a half shaft. The wheel bearing hub defines a receptacle including internal splines. A bearing face of the wheel bearing hub defines an opening to the receptacle. The half shaft includes a joint housing and a stem extending from the joint housing. The stem is seated within the receptacle. The stem includes a splined portion, a shoulder, and a stop surface. The splined portion includes a plurality of external splines configured to mesh with the internal splines. The shoulder has a maximum outer diameter that is greater than a minor diameter of the internal splines of the wheel bearing hub. A stop surface is between the splined portion and the shoulder, the stop surface contacting ends of the internal splines of the wheel bearing hub to stop the joint housing from moving into contact with the bearing face.

20 Claims, 4 Drawing Sheets

(56) References Cited

U.S. PATENT DOCUMENTS

| | | | | |
|---|---|---|---|---|
| 6,488,589 | B2 * | 12/2002 | Ouchi | B60B 27/0094 464/178 |
| 8,297,631 | B2 | 10/2012 | Siebeneick et al. | |
| 8,360,655 | B2 * | 1/2013 | Ozawa | F16D 1/10 384/589 |
| 8,808,099 | B2 * | 8/2014 | Finetti | B60B 27/0036 277/572 |
| 8,944,694 | B2 * | 2/2015 | Fukumura | B60B 27/0084 384/589 |
| 9,656,517 | B2 * | 5/2017 | Mochinaga | F16D 3/223 |
| 10,086,649 | B2 * | 10/2018 | Norimatsu | F16D 1/076 |
| 10,386,253 | B2 * | 8/2019 | Hamada | G01L 5/00 |
| 11,828,335 | B2 * | 11/2023 | Kimes | B60B 27/0026 |
| 2008/0174112 | A1 | 7/2008 | Brunetti et al. | |
| 2008/0182674 | A1 | 7/2008 | Brunetti et al. | |
| 2009/0123101 | A1 | 5/2009 | Masuda | |
| 2011/0170817 | A1 * | 7/2011 | Niebling | B60B 27/0031 384/445 |
| 2015/0159699 | A1 * | 6/2015 | Baldwin | B60K 23/08 403/14 |
| 2024/0026929 | A1 * | 1/2024 | Pourroy-Solari | F16C 19/186 |
| 2024/0151265 | A1 * | 5/2024 | Fujio | F16C 19/186 |
| 2024/0383276 | A1 | 11/2024 | Schaaf | |

FOREIGN PATENT DOCUMENTS

| | | |
|---|---|---|
| JP | 2012036997 A | 2/2012 |
| JP | 2012149776 A | 8/2012 |
| JP | 2012224208 A | 11/2012 |
| KR | 20180137228 A | 12/2018 |

OTHER PUBLICATIONS

General Motors LLC, May 2019 GM Service Bulletin, "Intermittent Click Noise at Front of Vehicle, ABS, Traction Control System (TCS)/Stabilitrak Lamps May Illuminate Intermittently and/or Deactivate for Ignition Cycle;" Bulletin No. 19-NA-103.

German Office Action from counterpart DE102024139554.0, dated Oct. 29, 2025.

* cited by examiner

HALF SHAFT TO BEARING HUB CONNECTION TO REDUCE DRIVELINE CLICK

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a vehicle drive assembly.

A half shaft cooperates with a wheel bearing hub to rotate a wheel mounted to the wheel bearing hub. During torque transitions, a joint housing of the half shaft may move into contact with the bearing. This metal-to-metal contact may produce a clicking noise.

SUMMARY

In a feature, the present disclosure includes a vehicle drive assembly including a wheel bearing hub and a half shaft. The wheel bearing hub defines a receptacle including internal splines. A bearing face of the wheel bearing hub defines an opening to the receptacle. The half shaft includes a joint housing and a stem extending from the joint housing. The stem is configured to be seated within the receptacle of the wheel bearing hub. The stem includes a splined portion, a shoulder, and a stop surface. The splined portion includes a plurality of external splines configured to mesh with the internal splines. The shoulder is between the splined portion and the joint housing. The shoulder has a maximum outer diameter that is greater than a minor diameter of the internal splines of the wheel bearing hub. A stop surface is between the splined portion and the shoulder, the stop surface configured to contact ends of the internal splines of the wheel bearing hub to stop the joint housing from moving into contact with the bearing face.

In further features, the stop surface is spaced apart from the joint housing at a first distance, and the ends of the internal splines are spaced apart from the bearing face at a second distance, the first distance is greater than the second distance such that the bearing face does not contact the joint housing when the stop surface is in contact with the ends of the internal splines.

In further features, the stop surface includes a sloped surface.

In further features, the sloped surface of the stop surface contacts sloped ends of the internal splines to stop the joint housing from moving into contact with the bearing face.

In further features, the stop surface extends around the stem of the half shaft.

In further features, the stem further includes a transition area devoid of the plurality of external splines, the transition area is between the splined portion and the stop surface.

In further features, the shoulder is surrounded by, and spaced apart from, the wheel bearing hub.

In further features, a gap is defined between the bearing face and the joint housing.

In further features, a polymeric seal is seated in a gap defined between the bearing face and the joint housing, the polymeric seal contacts both the bearing face and the joint housing.

In further features, the polymeric seal includes an excluder outboard of the gap, the excluder configured to sit on the joint housing and restrict debris from entering the wheel bearing hub.

In further features, the joint housing is a constant velocity joint housing.

In a feature, the present disclosure includes a vehicle drive assembly including a wheel bearing hub and a half shaft. The wheel bearing hub defines a receptacle including internal splines. A bearing face of the wheel bearing hub defines an opening to the receptacle. The half shaft includes a joint housing and a stem extending from the joint housing. The stem is configured to be seated within the receptacle of the wheel bearing hub. The stem includes a splined portion, a shoulder, and a sloped stop surface. The splined portion includes a plurality of external splines configured to mesh with the internal splines. The shoulder is between the splined portion and the joint housing. The shoulder has a maximum outer diameter that is greater than a minor diameter of the internal splines of the wheel bearing hub. The sloped stop surface is between the splined portion and the shoulder. The sloped stop surface is in contact with ends of the internal splines of the wheel bearing hub to stop the joint housing from moving into contact with the bearing face. The sloped stop surface is spaced apart from the joint housing at a first distance, and the ends of the internal splines are spaced apart from the bearing face at a second distance. The first distance is greater than the second distance such that contact between the sloped stop surface and the ends of the internal splines stops the joint housing from contacting the bearing face.

In further features, the sloped stop surface extends around the stem.

In further features, the joint housing is a constant velocity joint housing.

In further features, the wheel bearing hub is seated in a steering knuckle.

In further features, a polymeric seal is seated in a gap defined between the bearing face and the joint housing, the polymeric seal contacts both the bearing face and the joint housing.

In further features, the polymeric seal includes an excluder outboard of the gap, the excluder configured to sit on the joint housing and restrict debris from entering the wheel bearing hub.

In a feature, the present disclosure includes a vehicle drive assembly including a wheel bearing hub and a half shaft. The wheel bearing hub defining a receptacle including internal splines. A bearing face of the wheel bearing hub defines an opening to the receptacle. A half shaft includes a joint housing and a stem extending from the joint housing. The stem is seated within the receptacle. The stem includes a splined portion and a plurality of external splines meshed with the internal splines. A shoulder is between the splined portion and the joint housing. The shoulder has a maximum outer diameter that is greater than a minor diameter of the internal splines of the wheel bearing hub. A stop surface is between the splined portion and the shoulder. The stop surface is in contact with ends of the internal splines of the wheel bearing hub to stop the joint housing from moving into contact with the bearing face. A polymeric seal is seated in a gap defined between the bearing face and the joint housing. The polymeric seal contacts both the bearing face and the joint housing.

In further features, the polymeric seal includes an excluder outboard of the gap. The excluder is configured to sit on the joint housing and restrict debris from entering the wheel bearing hub.

In further features, the stop surface is spaced apart from the joint housing at a first distance, and the ends of the internal splines are spaced apart from the bearing face at a second distance. The first distance is greater than the second distance such that contact between the stop surface and the ends of the internal splines stops the joint housing from contacting the bearing face.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
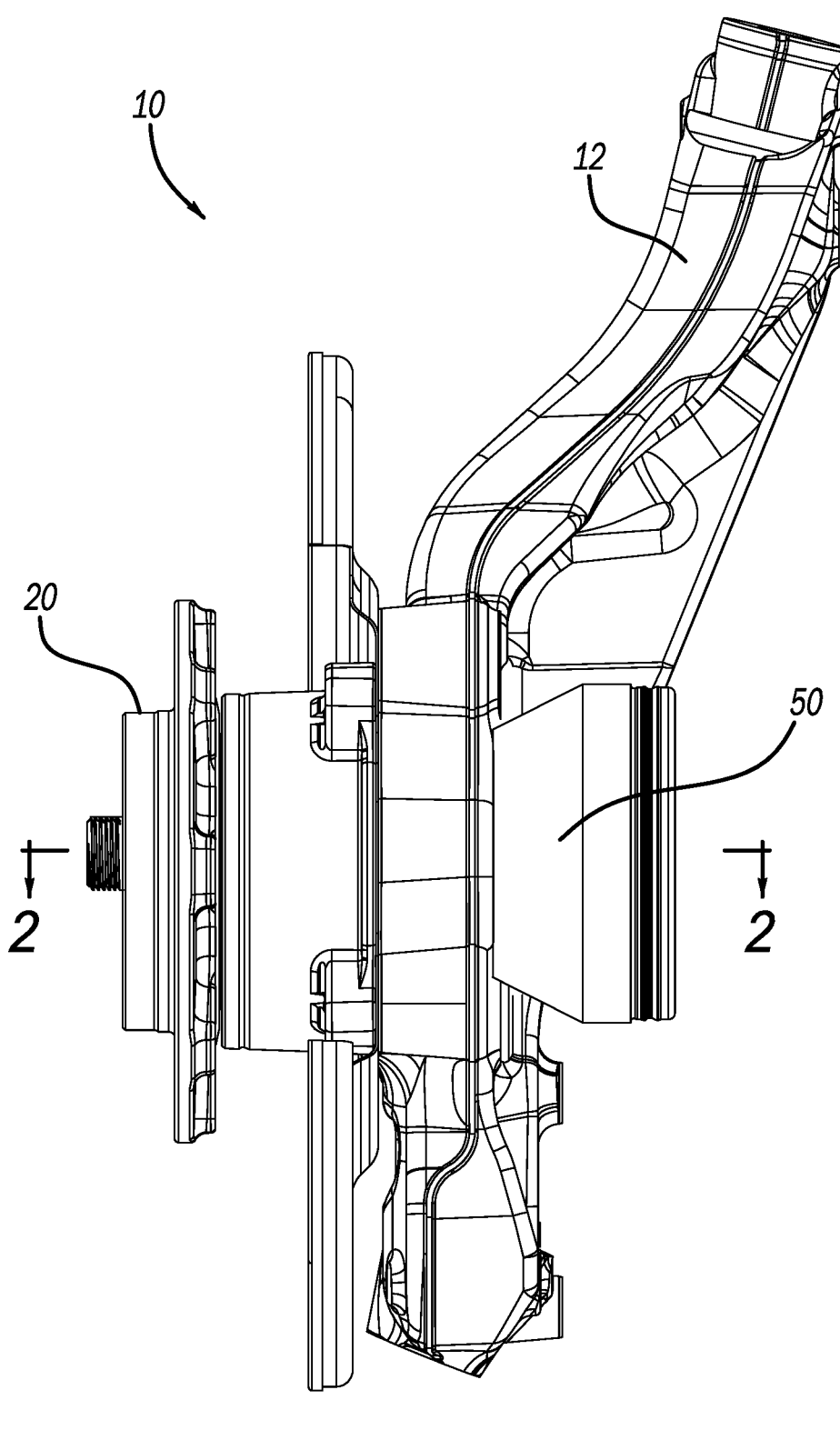
FIG. 1 is a side view of an exemplary vehicle drive assembly in accordance with the present disclosure.

FIG. 1 illustrates an exemplary drive assembly 10 in accordance with the present disclosure. The drive assembly 10 may be configured to drive a wheel of any suitable vehicle. The drive assembly 10 may be configured for use in non-vehicular applications as well. In the example illustrated, the drive assembly 10 generally includes a steering knuckle 12, a wheel bearing hub 20, and a half shaft 50. The wheel bearing hub 20 is seated in the steering knuckle 12. The half shaft 50 cooperates with the wheel bearing hub 20 to rotate the wheel bearing hub 20 and any wheel mounted thereto.

Figure 2:
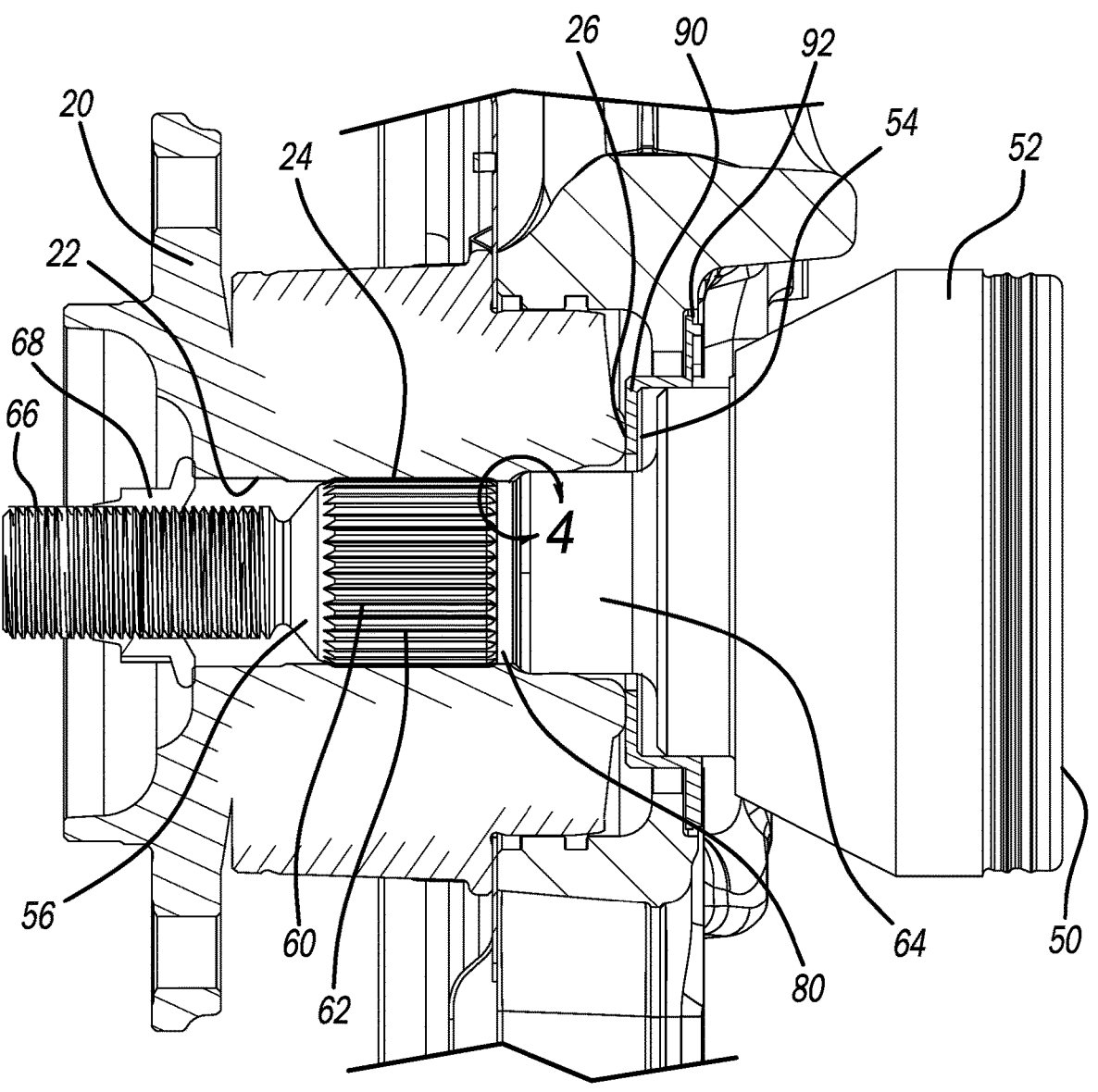
FIG. 2 is a cross-sectional view taken along line 2-2 of FIG. 1.
Figures 4, 5:
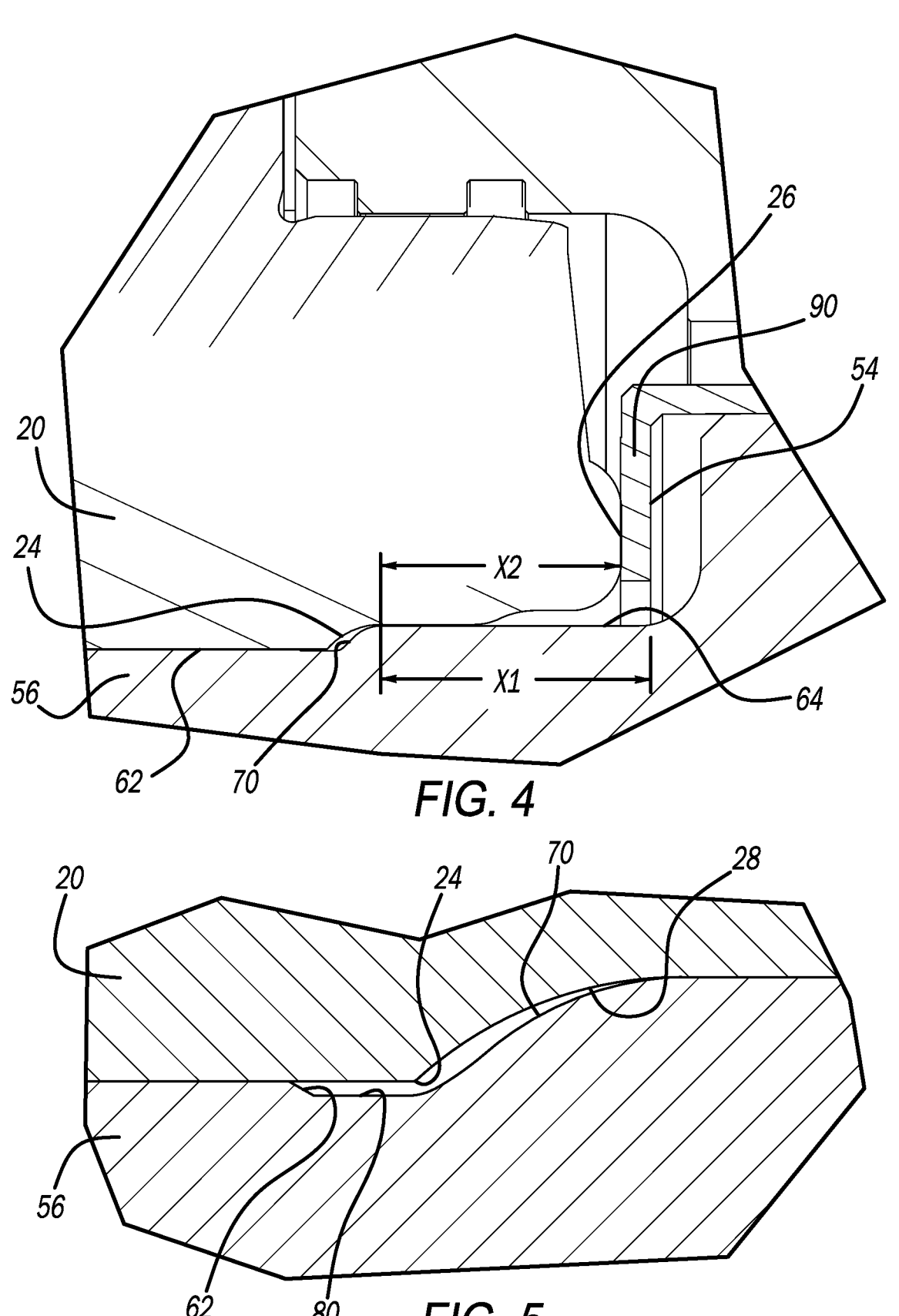
FIG. 4 illustrates area 4 of FIG. 2.
FIG. 5 illustrates interaction between the half shaft and an exemplary bearing.

With additional reference to FIGS. 2, 4, and 5, the wheel bearing hub 20 defines a receptacle 22. The receptacle 22 includes internal splines 24, which are arranged about an interior of the receptacle 22. A bearing face 26 of the wheel bearing hub 20 defines an opening to the receptacle 22.

With reference to FIGS. 1-5, the half shaft 50 includes a joint housing 52 with a housing face 54. The joint housing 52 is configured to house a constant velocity joint, or any other suitable joint. Extending from the joint housing 52 is a stem 56. The stem 56 includes a splined portion 60 including external splines 62. A plurality of the external splines 62 are arranged about the splined portion 60 of the stem 56.

The stem 56 further includes a shoulder 64 between the housing face 54 and the splined portion 60. The shoulder 64 is without splines. The shoulder 64 has a maximum diameter that is greater than a minor diameter of the internal splines 24 of the bearing 20. The shoulder 64 has an outer surface that is spaced apart from the wheel bearing hub 20 so as to not contact the wheel bearing hub 20 when the stem 56 is seated within the receptacle 22. A distal end 66 of the stem 56 is fastened to the wheel bearing hub 20 in any suitable manner, such as with any suitable fastener 68.

Figure 3:
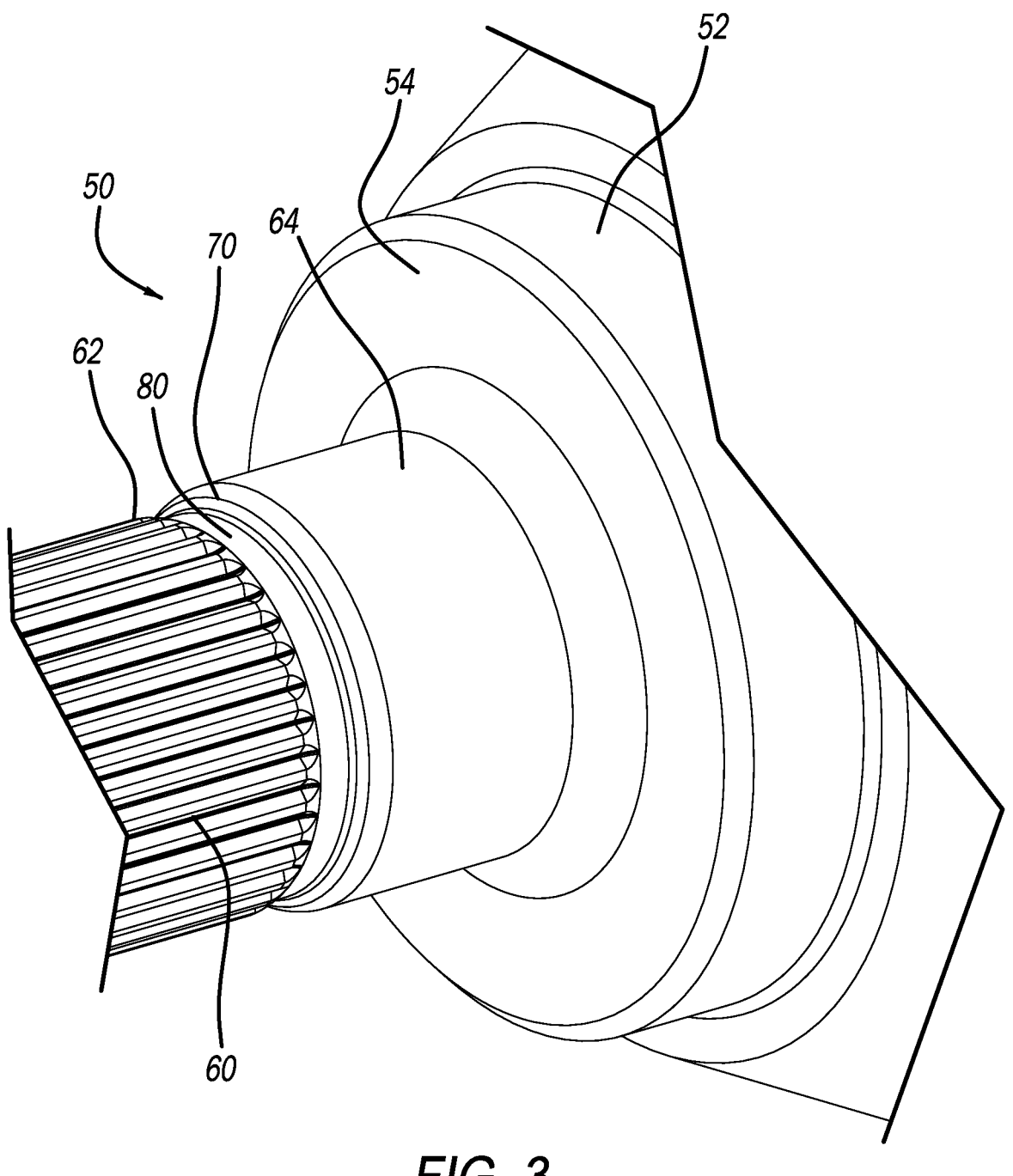
FIG. 3 is a perspective view of an exemplary half shaft of the vehicle drive assembly of FIG. 1.

With particular reference to FIGS. 3-5, the stem 56 includes a stop surface 70, which is an intermediate surface between the shoulder 64 and the splined portion 60. The stop surface 70 may be integral with the shoulder 64, or spaced apart from the shoulder 64. The stop surface 70 may be any suitable sloped surface, ridge, curved surface, planar surface, flange, protrusion, etc. The stop surface 70 may extend completely, partially, or intermittently around the stem 56. Between the stop surface 70 and the splined portion 60 is a transition area 80. The transition area 80 may be devoid of the external splines 62.

The stop surface 70 is configured to contact the internal splines 24 of the wheel bearing hub 20 to stop the housing face 54 of the joint housing 52 from moving into contact with the bearing face 26. With particular reference to FIG. 4, the stop surface 70 is spaced apart from the housing face 54 at a first distance X1. Ends of the internal splines 24 that contact the stop surface 70 are spaced apart from the bearing face 26 at a second distance X2. The first distance X1 is greater than the second distance X2. Therefore, as the stem 56 is inserted into the receptacle 22, the stop surface 70 will contact the ends of internal splines 24 before the housing face 54 contacts the bearing face 26. Contact between the stop surface 70 and the internal splines 24 prevents the stem 56 from being inserted further into the receptacle 22, and thus a gap will be defined between the housing face 54 and the bearing face 26. The present disclosure thus generally moves the location of where the half shaft 50 bottoms out to the bearing 20 from a bearing roll form area at the bearing face 26 to the internal splines 24 to reduce the risk of click and eliminate need for washer between the bearing face 26 and the housing face 54.

With reference to FIG. 5, the stop surface 70 may be configured as a sloped surface of the stem 56. The sloped surface may have any suitable slope and shape. The sloped stop surface 70 is configured to contact any suitable portion of the internal splines 24, such as sloped inner ends 28 of the internal splines 24. In the configuration of FIG. 5, contact between the sloped stop surface 70 and the sloped inner ends 28 of the internal splines 24 generally occurs at an uppermost portion of the sloped stop surface 70 nearest the shoulder 64.

The half shaft 50 may twist and/or bend under torsional loads during torque transitions, which may cause the housing face 54 to move towards the bearing face 26. The gap is sized such that any twisting or bending of the half shaft 50 during torque transitions will not result in contact between the housing face 54 and the bearing face 26. Cooperation between the stop surface 70 and the internal splines 24 also limits the degree to which the joint housing 52 can twist during torque transitions, which limits movement of the housing face 54 towards the bearing face 26 to further prevent contact between the housing face 54 and the bearing face 26.

With particular reference to FIGS. 2 and 4, a seal 90 is arranged in the gap between the housing face 54 and the bearing face 26. The seal 90 is made of any suitable polymeric material. The seal 90 has a thickness sufficient to span the gap so that the seal 90 contacts both the housing face 54 and the bearing face 26, which retains the seal 90 in the gap. The seal 90 extends around the stem 56 to prevent dirt and other debris from entering the wheel bearing hub 20. The seal 90 extends along the housing face 54 from the gap. At a top end of the seal 90 is an excluder 92. The excluder 92 is an outwardly extending portion that is integral with the rest of the seal 90. The excluder 92 is also configured to keep dirt and debris out of the wheel bearing hub 20 and away from a speed sensor. The excluder 92 is anchored by the portion of the seal 90 between the housing face 54 and the bearing face 26. Because the excluder 92 is rigidly secured between the housing face 54 and the bearing face 26, the excluder 92 will have limited flex as surrounding parts move or possibly rust.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A vehicle drive assembly comprising:
   a wheel bearing hub defining a receptacle including internal splines, a bearing face of the wheel bearing hub defines an opening to the receptacle; and
   a half shaft including a joint housing and a stem extending from the joint housing, the stem seated within the receptacle of the wheel bearing hub, the stem including:
      a splined portion including a plurality of external splines meshed with the internal splines;
      a shoulder between the splined portion and the joint housing, the shoulder has a maximum outer diameter that is greater than a minor diameter of the internal splines of the wheel bearing hub; and
      a stop surface between the splined portion and the shoulder, the stop surface contacting ends of the internal splines of the wheel bearing hub to stop the joint housing from moving into contact with the bearing face.

2. The vehicle drive assembly of claim 1, wherein the stop surface is spaced apart from the joint housing at a first distance, and the ends of the internal splines are spaced apart from the bearing face at a second distance, the first distance is greater than the second distance such that the bearing face does not contact the joint housing when the stop surface is in contact with the ends of the internal splines.

3. The vehicle drive assembly of claim 1, wherein the stop surface includes a sloped surface.

4. The vehicle drive assembly of claim 3, wherein the sloped surface of the stop surface contacts sloped ends of the internal splines to stop the joint housing from moving into contact with the bearing face.

5. The vehicle drive assembly of claim 4, wherein the stop surface extends around the stem of the half shaft.

6. The vehicle drive assembly of claim 1, wherein the stem further includes a transition area devoid of the plurality of external splines, the transition area is between the splined portion and the stop surface.

7. The vehicle drive assembly of claim 1, wherein the shoulder is surrounded by, and spaced apart from, the wheel bearing hub.

8. The vehicle drive assembly of claim 1, further comprising a gap defined between the bearing face and the joint housing.

9. The vehicle drive assembly of claim 1, further comprising a polymeric seal seated in a gap defined between the bearing face and the joint housing, the polymeric seal contacts both the bearing face and the joint housing.

10. The vehicle drive assembly of claim 9, wherein the polymeric seal includes an excluder outboard of the gap, the excluder seated on the joint housing to restrict debris from entering the wheel bearing hub.

11. The vehicle drive assembly of claim 1, wherein the joint housing is a constant velocity joint housing.

12. A vehicle drive assembly comprising:
   a wheel bearing hub defining a receptacle including internal splines, a bearing face of the wheel bearing hub defines an opening to the receptacle; and
   a half shaft including a joint housing and a stem extending from the joint housing, the stem seated within the receptacle of the wheel bearing hub, the stem including:
      a splined portion including a plurality of external splines meshed with the internal splines;
      a shoulder between the splined portion and the joint housing, the shoulder has a maximum outer diameter that is greater than a minor diameter of the internal splines of the wheel bearing hub; and
      a sloped stop surface between the splined portion and the shoulder, the sloped stop surface in contact with ends of the internal splines of the wheel bearing hub to stop the joint housing from moving into contact with the bearing face;
   wherein the sloped stop surface is spaced apart from the joint housing at a first distance, and the ends of the internal splines are spaced apart from the bearing face at a second distance, the first distance is greater than the second distance such that contact between the sloped stop surface and the ends of the internal splines stops the joint housing from contacting the bearing face.

13. The vehicle drive assembly of claim 12, wherein the sloped stop surface extends around the stem.

14. The vehicle drive assembly of claim 12, wherein the joint housing is a constant velocity joint housing.

15. The vehicle drive assembly of claim 12, wherein the wheel bearing hub is seated in a steering knuckle.

16. The vehicle drive assembly of claim 12, further comprising a polymeric seal seated in a gap defined between the bearing face and the joint housing, the polymeric seal contacts both the bearing face and the joint housing.

17. The vehicle drive assembly of claim 16, wherein the polymeric seal includes an excluder outboard of the gap, the excluder seated on the joint housing to restrict debris from entering the wheel bearing hub.

18. A vehicle drive assembly comprising:

a wheel bearing hub defining a receptacle including internal splines, a bearing face of the wheel bearing hub defines an opening to the receptacle; and a half shaft including a joint housing and a stem extending from the joint housing, the stem seated within the receptacle, the stem including:

a splined portion including a plurality of external splines meshed with the internal splines;

a shoulder between the splined portion and the joint housing, the shoulder has a maximum outer diameter that is greater than a minor diameter of the internal splines of the wheel bearing hub; and a stop surface between the splined portion and the shoulder, the stop surface in contact with ends of the internal splines of the wheel bearing hub to stop the joint housing from moving into contact with the bearing face; and a polymeric seal seated in a gap defined between the bearing face and the joint housing, the polymeric seal contacts both the bearing face and the joint housing.

19. The vehicle drive assembly of claim 18, wherein the polymeric seal includes an excluder outboard of the gap, the excluder seated on the joint housing to restrict debris from entering the wheel bearing hub.

20. The vehicle drive assembly of claim 18, wherein the stop surface is spaced apart from the joint housing at a first distance, and the ends of the internal splines are spaced apart from the bearing face at a second distance, the first distance is greater than the second distance such that contact between the stop surface and the ends of the internal splines stops the joint housing from contacting the bearing face.

\* \* \* \* \*